United States Patent Office 3,108,829
Patented Oct. 29, 1963

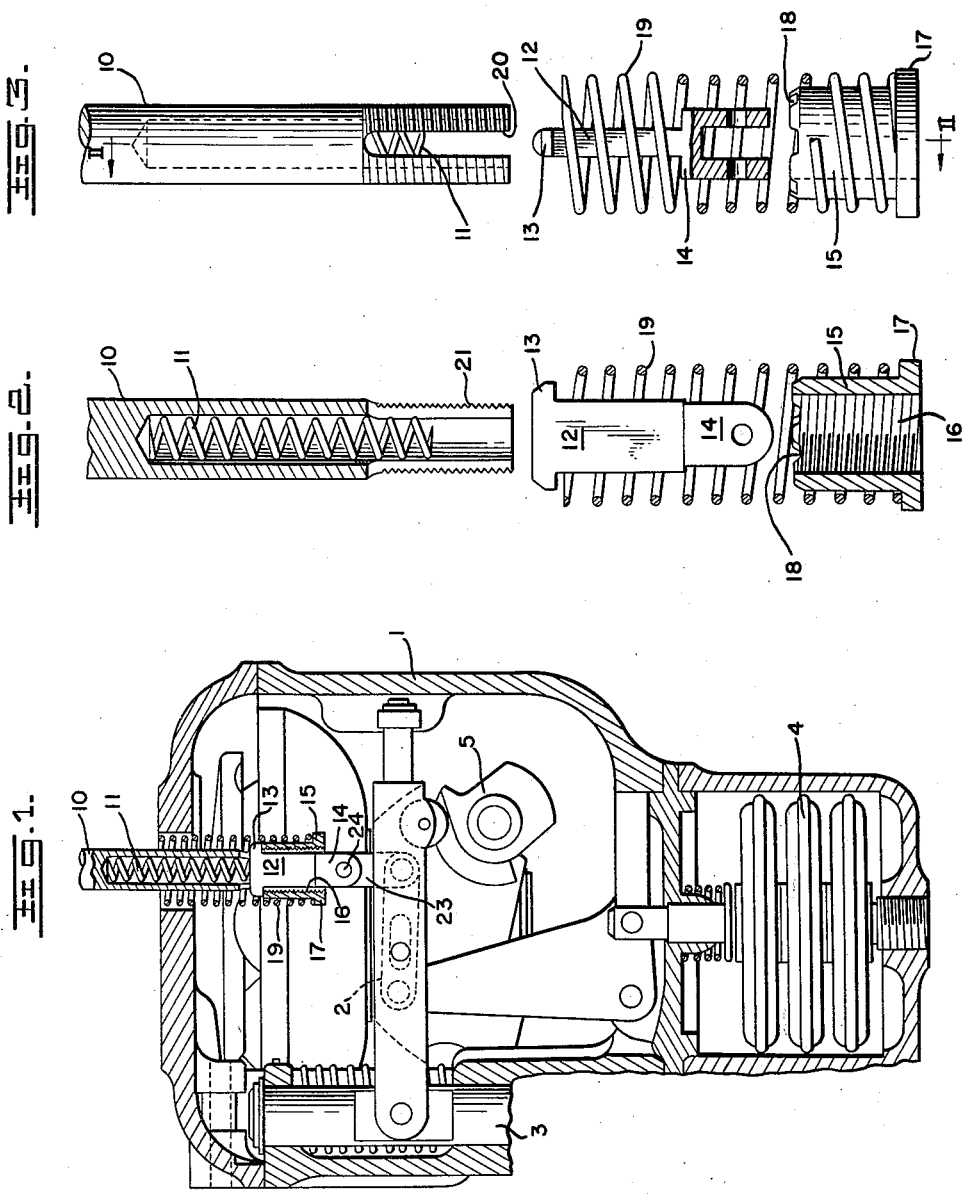

3,108,829
CONTROL ARRANGEMENT, PARTICULARLY FOR FUEL INJECTION PUMPS
Robert J. Wirsching, Korntal, near Stuttgart, Germany, assignor to Daimler-Benz Aktiengesellschaft, Stuttgart-Unterturkheim, Germany
Filed Aug. 1, 1958, Ser. No. 752,531
Claims priority, application Germany Aug. 3, 1957
3 Claims. (Cl. 287—62)

The present invention relates to a control arrangement for controlling the fuel injection quantity, particularly for mixture-compressing fuel-injection internal combustion engines in which a longitudinally displaceable or movable transmission member is influenced or acted upon by a control device, for example, by a barometric cell or bellows over a lever arrangement whereby the movable transmission member is connected by means of a further linkage with the regulator or control rod of the injection pump of the internal combustion engine or constitutes itself the regulator or control rod thereof.

Installations and arrangements of this type known in the prior art may be influenced by a plurality of factors affecting the behavior of the engine, such as the cooling water temperature, the rotational speed and the atmospheric pressure. These external factors or control magnitudes initially registered or received by the control device as individual components, are then converted into mechanical lever adjustments and are thereupon combined in a lever arrangement into a resultant which in turn is transmitted to the injection pump as a compensating factor. The transmission of the resulting factor or magnitude is accomplished by the aforementioned transmission member which is actuated by the control device, and which in turn then displaces another lever arrangement for the adjustment of the piston within the injection pump or as a control rack directly adjusts itself the pistons of the injection pump.

The individual external factors or magnitudes cause proportional lever adjustments within the control device and, consequently, only proportional compensating or correcting values are transmitted to the transmission member. The absolute value or magnitude of the increased or decreased injection quantity could thereby be adjusted only once in the control device of the prior art arrangements, namely at the time of the design or lay-out of the control device, particularly as to translation or lever ratio or as to the transmission system. Any change in the absolute value of the increased or decreased injection quantity is possible only with great difficulty after assembly and installation of the prior art control devices.

The present invention eliminates these disadvantages of the prior art devices. It is possible by the use of the present invention to adjust in the most simple manner a richer or leaner injection mixture, to adapt the various fuel mixtures to the different heat conditions or thermal values, and to take into consideration and make allowance for the internal changes within the engine in the course of its lifetime.

Accordingly, it is an object of the present invention to provide a control arrangement for controlling the fuel injection quantity in which the absolute injection quantity may be adjusted even after assembly of the device in a simple manner.

Another object of the present invention resides in the provision of a control arrangement for automatically controlling the quantity of injected fuel in dependence on external factors such as temperature of the cooling water, atmospheric pressure, rotational speed, et cetera, while at the same time enabling adjustment at any time of the absolute value of the injection quantity from which the automatic adjustment is made.

Still another object of the present invention is the provision of an automatic control arrangement for the quantity of fuel injected by an injection pump for an internal combustion engine which is simple in construction, permits ready assembly and automatic adjustment with the added feature of making subsequent adjustments in the absolute value of the quantity of fuel injected, for example, to take into consideration the changes which occur in the engine during operation thereof over a period of time.

These and other objects, features and advantages of the present invention will become more obvious from the following description when taken in connection with the accompanying drawing, which shows for purposes of illustration only, one embodiment in accordance with the present invention, and wherein:

FIGURE 1 is a cross sectional view through a mechanical regulator arrangement in accordance with the present invention in longitudinal cross section thereof, FIGURE 2 is an exploded view on an enlarged scale of the individual parts constituting the lower part of the transmission member in accordance with the present invention taken along line II—II of FIGURE 3, and FIGURE 3 is a side view of the parts illustrated in FIGURE 2.

The present invention consists essentially in that the longitudinally movable transmission member is adapted to be extended or shortened by means of a threaded connection for the purpose of transmitting the correcting magnitudes or compensating factors from the control device to the regulator or control rack of the injection pump. The transmission member, which serves to adjust the piston of the injection pump either directly or indirectly over a lever arrangement, may be constructed at one end thereof in a sleeve-shaped manner, may be provided thereat with an external or male thread, and may be provided with a slot-shaped cut-out at the lower part of the sleeve-shaped portion. The slot-shaped cut-out portion receives a flat intermediate link member, the upper part of which is constructed in the shape of a hammer-head. The intermediate link member is thereby spring-loaded at the hammer-head thereof by a helical spring which presses or urges the side portions of the hammer-head into recesses provided for this purpose in the top of the nut member. The nut member itself is spring-loaded by the restoring or return spring of the control rack. The lower end of the intermediate link member serves to receive or accommodate a connecting link member operatively connected with the lever arrangement of the control device. By rotating the nut member along the external or male thread of the sleeve-shaped end of the transmission link member, the latter is adapted to be raised or lowered whereby the nut member abuts against the sides or edges of the hammer head of the flat intermediate member. The allowance or clearance of the injection quantity control is thereby shifted to another range.

Referring now to the drawing wherein like reference numerals are used throughout the various views to designate like parts, and more particularly to FIGURE 1, the lever arrangement shown therein is accommodated on the inside of the regulator housing 1. The individual influencing magnitudes or determining factors are transmitted over suitable joints to the lever member 2. In particular, the temperature of the cooling water is measured by the thermometer 3 and is translated thereby into a corresponding lever movement. The atmospheric pressure is measured by three barometric cells 4 and is also transmitted to the lever member 2 over an angle lever or bell crank. The three-dimensional cam 5 transmits to the lever member 2 a determining factor or influencing magnitude dependent on the different rotational speeds.

The above-described translation of the cooling water temperature, the barometric pressure and the rotational speed of the engine into a corresponding lever movement constitutes the regulator means of the inventive arrangement. The longitudinally movable transmission link member 10 constructed as a rod enters into and terminates in the upper part of housing 1. The particular construction of the transmission link member may be readily seen from FIGURES 2 and 3.

As shown particularly in FIGURES 2 and 3, the lower end of the transmission link member 10 is constructed in the present embodiment in a sleeve-shaped manner. This sleeve-shaped end is provided with a slot-shaped cut-out portion 20, in which the flat intermediate link member 12 is accommodated or received. The helical spring 11 which, when assembled, spring-loads the hammer-head 13 of the intermediate link member 12 is seated within the sleeve portion. A nut member 15 surrounds the two leg portions of the sleeve-shaped portion of transmission member 10 which are formed by the slot-shaped cut-out portions 20. At the same time, the nut member 15 surrounds also the flat intermediate member 12. The sides of the hammer-head 13 of the flat intermediate member 12 are seated against the top of nut member 15, whereby the nut member 15 contains several recesses 18. The nut member 15 threadably engages the external thread 21 of the sleeve-shaped part of transmission link member 10 by means of the internal thread 16 thereof.

When nut member 15 is rotated, the flat intermediate member 12 remains stationary or fixed while the transmission link member 10 is raised or lowered respectively by means of the external thread 21 thereof thereby causing an adjustment of the piston inside the injection pump either directly or by means of an additional lever arrangement with the result that the range of the injection quantity control allowance is correspondingly displaced or readjusted. The sides of the hammer-head 13 of the flat intermediate member 12 engage the aforementioned recesses 18 in certain positions. In this manner predetermined adjustments or settings of the injection pump are attained. In the present embodiment, a shackle 23 is pivotally connected with a fork-shaped head 14 by means of a bolt 24. The shackle 23 thereby forms the connection between the regulating device and the lever arrangement 2. The nut member 15 is additionally provided with a rim portion 17 at the lower end thereof. The restoring or return spring 19 for the transmission link member 10 rests against the rim portion 17.

While I have shown and described one embodiment in accordance with the present invention, it is understood that the same is not limited thereto but is susceptible of many changes and modifications within the scope and spirit of the present invention, and I, therefore, do not wish to be limited thereto, but intend to cover all such changes and modifications as are encompassed by the appended claims.

I claim:
1. A length adjusting mechanism including a rod-shaped member having a sleeve-shaped portion at one end thereof and provided thereat with an external thread and slot-shaped cut-out portions, an intermediate member having at the upper end thereof a substantially hammer-shaped head portion accommodated in said slot-shaped cut-out portions, a nut member threadably engaging the external thread of said sleeve-shaped portion, the sides of said substantially hammer-shaped head portion essentially resting against said nut member, linkage means operatively connected adjacent the lower end of said intermediate member and adapted to impart movement thereto, and a helical spring accommodated within said sleeve-shaped portion and abutting at one end thereof against the wall of said sleeve-shaped portion and at the other end thereof against said substantially hammer-shaped head portion.

2. A length adjusting mechanism including a rod-shaped member having a sleeve-shaped portion at one end thereof and provided thereat with an external thread and slot-shaped cut-out portions, a flat intermediate member having at the upper end thereof a substantially hammer-shaped head portion accommodated in said slot-shaped cut-out portions, a nut member threadably engaging the external thread of said sleeve-shaped portion, said nut member including a rim portion, a return spring abutting against said rim portion, the sides of said substantially hammer-shaped head portion essentially resting against said nut member, and a helical spring accommodated within said sleeve-shaped portion and abutting at one end thereof against the wall of said sleeve-shaped portion and at the other end thereof against said substantially hammer-shaped head portion.

3. A length adjusting mechanism according to claim 2, wherein said nut member is provided with a plurality of recesses in the top thereof to enable predetermined engagement by said substantially hammer-shaped head portion in said recesses.

References Cited in the file of this patent
UNITED STATES PATENTS

| | | |
|---|---|---|
| 1,813,078 | Nyrop | July 8, 1931 |
| 1,824,467 | Darby et al. | Sept. 22, 1931 |
| 2,119,567 | Williams | June 7, 1938 |
| 2,147,989 | Puurmann | Feb. 21, 1939 |
| 2,245,562 | Becker | June 17, 1941 |
| 2,261,856 | Neugebauer et al. | Nov. 4, 1941 |
| 2,279,048 | Kittler et al. | Apr. 7, 1942 |
| 2,350,781 | Lichte | June 6, 1944 |
| 2,514,674 | Schorn | July 11, 1950 |
| 2,776,573 | Wili | Jan. 8, 1957 |
| 2,783,652 | Smith | Mar. 5, 1957 |
| 2,923,566 | Burhop | Feb. 2, 1960 |